United States Patent
Zhao et al.

(10) Patent No.: US 12,549,735 B2
(45) Date of Patent: Feb. 10, 2026

(54) BILATERAL MATCHING FOR COMPOUND REFERENCE MODE

(71) Applicant: Tencent America LLC, Palo Alto, CA (US)

(72) Inventors: Liang Zhao, Palo Alto, CA (US); Xin Zhao, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 287 days.

(21) Appl. No.: 18/196,372

(22) Filed: May 11, 2023

(65) Prior Publication Data

US 2023/0412816 A1    Dec. 21, 2023

Related U.S. Application Data

(60) Provisional application No. 63/353,788, filed on Jun. 20, 2022.

(51) Int. Cl.
*H04N 19/137* (2014.01)
*H04N 19/159* (2014.01)
(Continued)

(52) U.S. Cl.
CPC ........ *H04N 19/137* (2014.11); *H04N 19/159* (2014.11); *H04N 19/176* (2014.11); *H04N 19/30* (2014.11)

(58) Field of Classification Search
CPC .. H04N 19/137; H04N 19/159; H04N 19/176; H04N 19/30
See application file for complete search history.

(56) References Cited

U.S. PATENT DOCUMENTS

| | | |
|---|---|---|
| 2011/0129015 A1 | 6/2011 | Nguyen et al. |
| 2021/0092379 A1 | 3/2021 | Zhang et al. |

(Continued)

FOREIGN PATENT DOCUMENTS

WO    WO 2021086021 A1    5/2021

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020, 541 pgs.

(Continued)

*Primary Examiner* — Jeremiah C Hallenbeck-Huber
(74) *Attorney, Agent, or Firm* — Morgan, Lewis & Bockius LLP

(57) ABSTRACT

The various implementations described herein include methods and systems for coding video. In one aspect, a method includes receiving a current coding block in a current image frame from a video bitstream and determining that the current coding block is to be predicted in a joint motion vector difference (JMVD) mode. The method further includes in the JMVD mode, determining that the current coding block is associated with a forward prediction block and a backward prediction block, and based on a cost criterion of a difference of the forward the backward prediction blocks, refining a motion vector difference for at least the forward prediction block to determine a first refined motion vector difference. The method further includes generating the forward prediction block based on at least the first refined motion vector difference and determining motion compensation data of the current coding block based on the forward and backward prediction blocks.

20 Claims, 9 Drawing Sheets

(51) Int. Cl.
*H04N 19/176* (2014.01)
*H04N 19/30* (2014.01)

(56) References Cited

U.S. PATENT DOCUMENTS

| | | | | |
|---|---|---|---|---|
| 2021/0274213 | A1* | 9/2021 | Xiu | H04N 19/86 |
| 2021/0392356 | A1* | 12/2021 | Chujoh | H04N 19/70 |
| 2022/0094913 | A1* | 3/2022 | Xiu | H04N 19/172 |
| 2022/0103857 | A1* | 3/2022 | Huo | H04N 19/517 |
| 2022/0132159 | A1* | 4/2022 | Xiu | H04N 19/17 |
| 2022/0167002 | A1* | 5/2022 | Chujoh | H04N 19/46 |
| 2022/0217356 | A1* | 7/2022 | Jiang | H04N 19/70 |
| 2023/0254502 | A1 | 8/2023 | Zhao et al. | |
| 2024/0275943 | A1* | 8/2024 | Zhang | H04N 19/583 |

OTHER PUBLICATIONS

Peter de Rivaz et al., "AV1 Bitstream & Decoding Process Specification", The Alliance for Open Media, Jan. 8, 2019, 681 pgs.

Elliott Karpilovsky et al., "Proposal: New Inter Modes for AV2", Document: CWG-8018 v1, Alliance for Open Media, Codec Working Group, Feb. 24, 2021, 6 pgs.

Leo Zhao et al., "Advanced Motion Vector Difference Coding", Document: CWG-B092, Alliance for Open Media, Codec Working Group, Nov. 24, 2021, 7 pgs.

Leo Zhao et al., "Improved Adaptive MVD Resolution", Document: CWG-C011, Alliance for Open Media, Codec Working Group, Feb. 9, 2022, 7 pgs.

Lester (Keng-Shih) Lu et al., "Optical FLow Motion Vector Refinement for AV2", Document: CWG-B041_v3, Alliance for Open Media Codec Working Group, Google, Sep. 20, 2021, 11 pgs.

Xin Zhao et al., "Tool Description for AV1 and Libaom", Document: CWG-B078_v1, Alliance for Open Media Codec Working Group, Oct. 4, 2021, 41 pgs.

Yue Chen et al., "An Overview of Core Coding Tools in the AVI Video Codec", 2018 IEEE, 5 pgs.

Tencent Technology, ISRWO, PCT/US2023/066960, Sep. 29, 2023, 13 pgs.

* cited by examiner $MV_A = MVP_A + MVD_A$ $MV_A = MVP_A + MVD_A'$
$\quad = MVP_A + MVD_A + \text{Refined } MVD_A$

BILATERAL MATCHING FOR COMPOUND REFERENCE MODE

CROSS-REFERENCE TO RELATED APPLICATION

This application claims priority to U.S. Provisional Patent Application No. 63/353,788, entitled "BILATERAL MATCHING FOR COMPOUND REFERENCE MODE," filed Jun. 20, 2022, which is hereby incorporated by reference in its entirety.

TECHNICAL FIELD

The disclosed embodiments relate generally to video coding, including but not limited to systems and methods for refining a motion vector difference associated with two reference prediction blocks of a coding block in a bilateral matching scheme of inter prediction of video data.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored.

Multiple video codec standards have been developed. For example, video coding standards include AOMedia Video 1 (AV1), Versatile Video Coding (VVC), Joint Exploration test Model (JEM), High-Efficiency Video Coding (HEVC/H.265), Advanced Video Coding (AVC/H.264), and Moving Picture Expert Group (MPEG) coding. Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality.

HEVC, also known as H.265, is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC), also known as H.266, is a video compression standard intended as a successor to HEVC. ITU-T and ISO/IEC published the VVC/H.266 standard in 2020 (version 1) and 2022 (version 2). AV1 is an open video coding format designed as an alternative to HEVC. On Jan. 8, 2019, a validated version 1.0.0 with Errata 1 of the specification was released.

SUMMARY

As mentioned above, encoding (compression) reduces the bandwidth and/or storage space requirements. As described in detail later, both lossless compression and lossy compression can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

The present disclosure describes refining a motion vector difference (MVD) of motion vectors connecting a coding block to two reference prediction blocks in a bilateral matching scheme of inter prediction of video data. Joint coding of MVD is applied to generate motion compensation data of a current coding block based on two reference prediction blocks that belong to the same group of pictures (GOP) with the current coding block. In some situations, linear motion exists between a backward reference block that precedes the current coding block and a forward reference block that follows the current coding block. A joint MVD coding mode is implemented to signal a joint MVD for both of the two reference prediction blocks. For each reference block, a respective MVD is derived from the joint MVD based on a distance between the reference block and current coding block. Conversely, in some situations, motion between the two reference frames is not linear, and motion speed optionally increases or decreases from the backward reference frame to the forward reference frame. In various embodiments of this application, the bilateral matching scheme is applied to code the current coding block using the forward reference block identified by a forward motion vector and the backward reference block identified by a backward motion vector. Each of the forward and backward motion vectors includes a motion vector prediction (MVP) and an MVD. The MVD is scaled by a scale factor or varied by a MVD refinement to generate a refined MVD. In some embodiments, the MVP and MVD of each motion vector is communicated between an encoder and a decoder, while the scale factor or the MVD refinement of each motion vector is not signaled and need to be determined separately in the encoder and decoder.

In accordance with some embodiments, a method of video coding is provided. The method includes receiving a current coding block in a current image frame from a video bitstream and determining that the current coding block is to be predicted in a joint motion vector difference (JMVD) mode. The method further includes in response to the current coding block being predicted in the JMVD mode, determining that the current coding block is associated with two bi-prediction blocks including a forward prediction block and a backward prediction block. The method further includes based on a cost criterion of a difference of the forward prediction block and the backward prediction block, refining a motion vector difference for at least the forward prediction block to determine a first refined motion vector difference. The method further includes generating the forward prediction block based on at least the first refined motion vector difference and determining motion compensation data of the current coding block based on the forward prediction block and the backward prediction block.

In some embodiments, refining the motion vector difference for at least the forward prediction block further includes scaling the motion vector difference with a plurality of predefined scale factors to generate a plurality of scaled motion vector differences for the forward prediction block, determining that a difference of the forward prediction block and the backward prediction block corresponding to one of the plurality of scaled motion vector differences satisfies the cost criterion, identifying the one of the plurality of scaled motion vector differences as the first refined motion vector difference, and determining a motion vector of the forward prediction block based on a motion vector predicator and the first refined motion vector difference. Alternatively, in some embodiments, refining the motion vector difference for at least the forward prediction block further includes obtaining a plurality of predefined motion vector refinements for the motion vector difference of the forward prediction block, determining that a difference of the forward prediction block and the backward prediction blocks corresponding to one of the plurality of predefined motion vector refinements satisfies the cost criterion, identifying the one of the plurality of predefined motion vector refinements as the first refined motion vector difference, and determining a motion vector of the forward prediction block based on a motion vector predicator, the motion vector difference, and the first refined motion vector difference.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and/or a decoder component.

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for coding video. Such methods, devices, and systems may complement or replace conventional methods, devices, and systems for video coding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

In accordance with common practice, the various features illustrated in the drawings are not necessarily drawn to scale, and like reference numerals can be used to denote like features throughout the specification and figures.

DETAILED DESCRIPTION

The present disclosure describes refining an MVD of motion vectors connecting a coding block to two reference prediction blocks in a bilateral matching scheme of inter prediction of video data. Joint coding of MVDs is applied to generate motion compensation data of a current coding block based on two reference prediction blocks including a backward reference block that precedes the current coding block in a GOP and a forward reference block that follows the current coding block in the GOP. In some situations, motion between these two reference prediction blocks is linear. A joint MVD coding mode is implemented to signal a joint MVD for both of the two reference prediction blocks. For each reference block, a respective MVD is derived from the joint MVD based on a distance between the reference block and current coding block. Conversely, in some situations, motion between the two reference frames is not linear, and a speed of the motion optionally increases or decreases from the backward reference frame to the forward reference frame. In various embodiments of this application, the bilateral matching scheme is applied to code the current coding block using the forward reference block identified by a forward motion vector and the backward reference block identified by a backward motion vector. Each of the forward and backward motion vectors includes an MVP and an MVD. The MVD is scaled by a scale factor or varied by an MVD refinement to generate a refined MVD. In some embodiments, the MVP and MVD of each motion vector is communicated in a bitstream of video data between an encoder and a decoder, while the scale factor or the MVD refinement of each motion vector is not signaled and need to be determined separately in the encoder and decoder.

Figure 1:
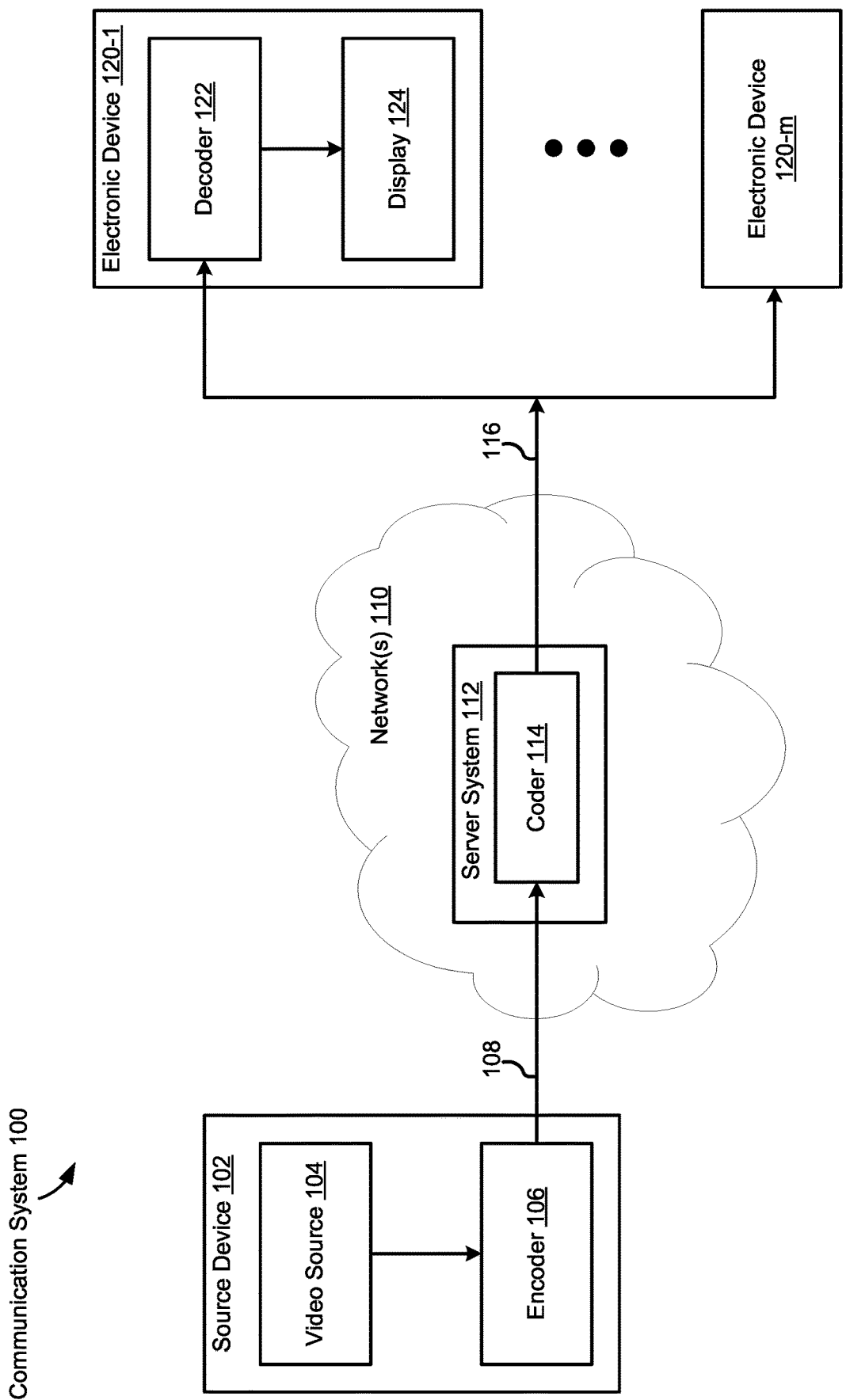
FIG. 1 is a block diagram illustrating an example communication system in accordance with some embodiments.

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video data to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108.

In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 to recover and optionally display the video pictures.

In some embodiments, the transmissions discussed above are unidirectional data transmissions. Unidirectional data transmissions are sometimes utilized in in media serving applications and the like. In some embodiments, the transmissions discussed above are bidirectional data transmissions. Bidirectional data transmissions are sometimes utilized in videoconferencing applications and the like. In some embodiments, the encoded video bitstream 108 and/or the encoded video data 116 are encoded and/or decoded in accordance with any of the video coding/compressions standards described herein, such as HEVC, VVC, and/or AV1.

Figure 2A:
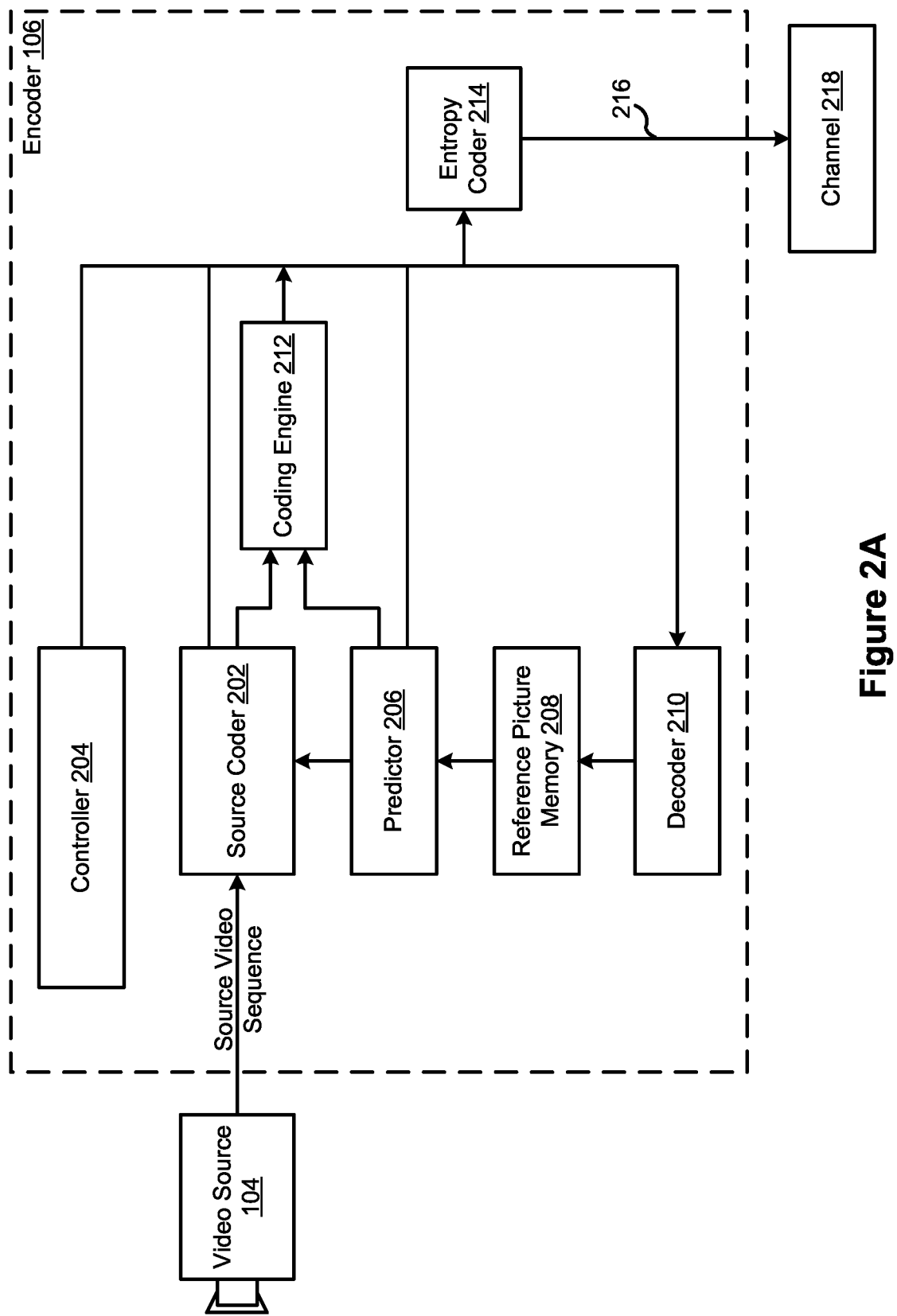
FIG. 2A is a block diagram illustrating example elements of an encoder component in accordance with some embodiments.

FIG. 2A is a block diagram illustrating example elements of the encoder component 106 in accordance with some embodiments. The encoder component 106 receives a source video sequence from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any color space (e.g., BT.601 Y CrCb, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples. The description below focuses on samples.

The encoder component 106 is configured to code and/or compress the pictures of the source video sequence into a coded video sequence 216 in real-time or under other time constraints as required by the application. Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

As part of its operation, the source coder 202 may perform motion compensated predictive coding, which codes an input frame predictively with reference to one or more previously coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. In some cases, as determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
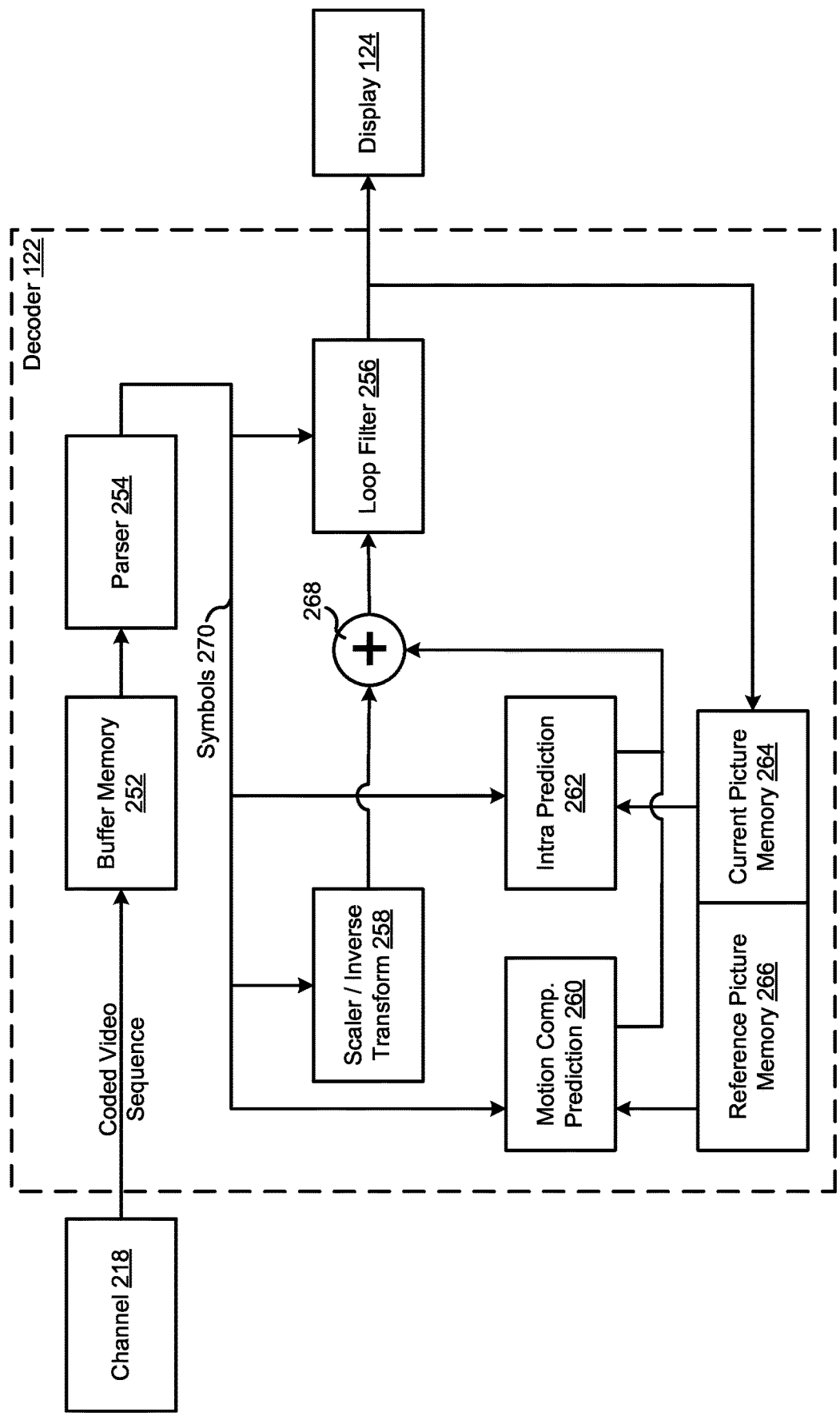
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, for example, temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. In some embodiments, the decoder component 122 is implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and can be advantageously of adaptive size, and may at least partially be implemented in an operating system or similar elements (not depicted) outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

Beyond the functional blocks already mentioned, decoder component 122 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is maintained.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation also can include interpolation of sample values as fetched from the reference picture memory 266 when sub-sample exact motion vectors are in use, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values.

The output of the loop filter unit 256 can be a sample stream that can be output to a render device such as the display 124, as well as stored in the reference picture memory 266 for use in future inter-picture prediction.

Certain coded pictures, once fully reconstructed, can be used as reference pictures for future prediction. Once a coded picture is fully reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
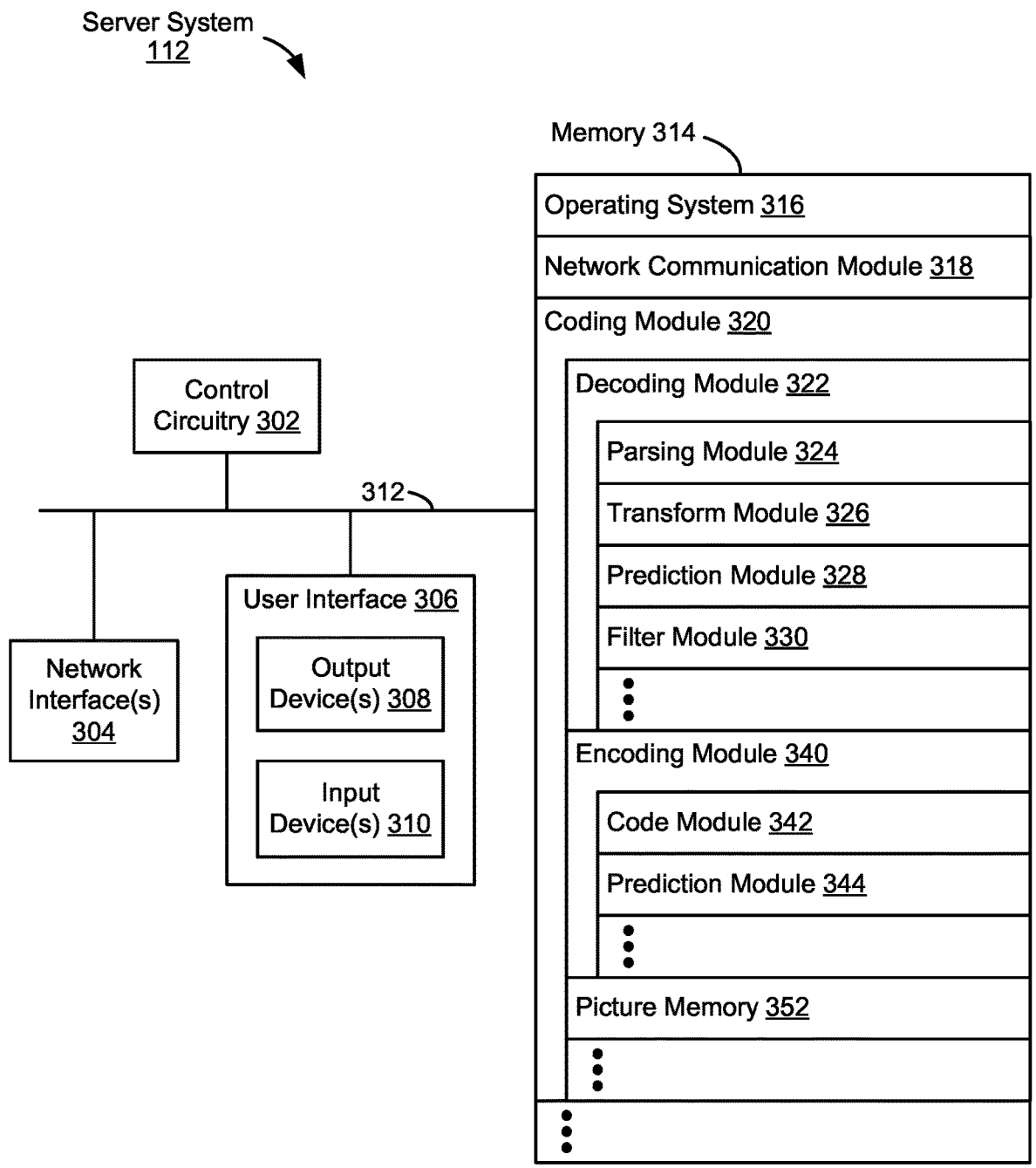
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes one or more field-programmable gate arrays (FPGAs), hardware accelerators, and/or one or more integrated circuits (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:
  - a decoding module 322 for performing various functions with respect to decoding encoded data, such as those described previously with respect to the decoder component 122; and
  - an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above, such as an audio processing module.

In some embodiments, the server system 112 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Figure 4:
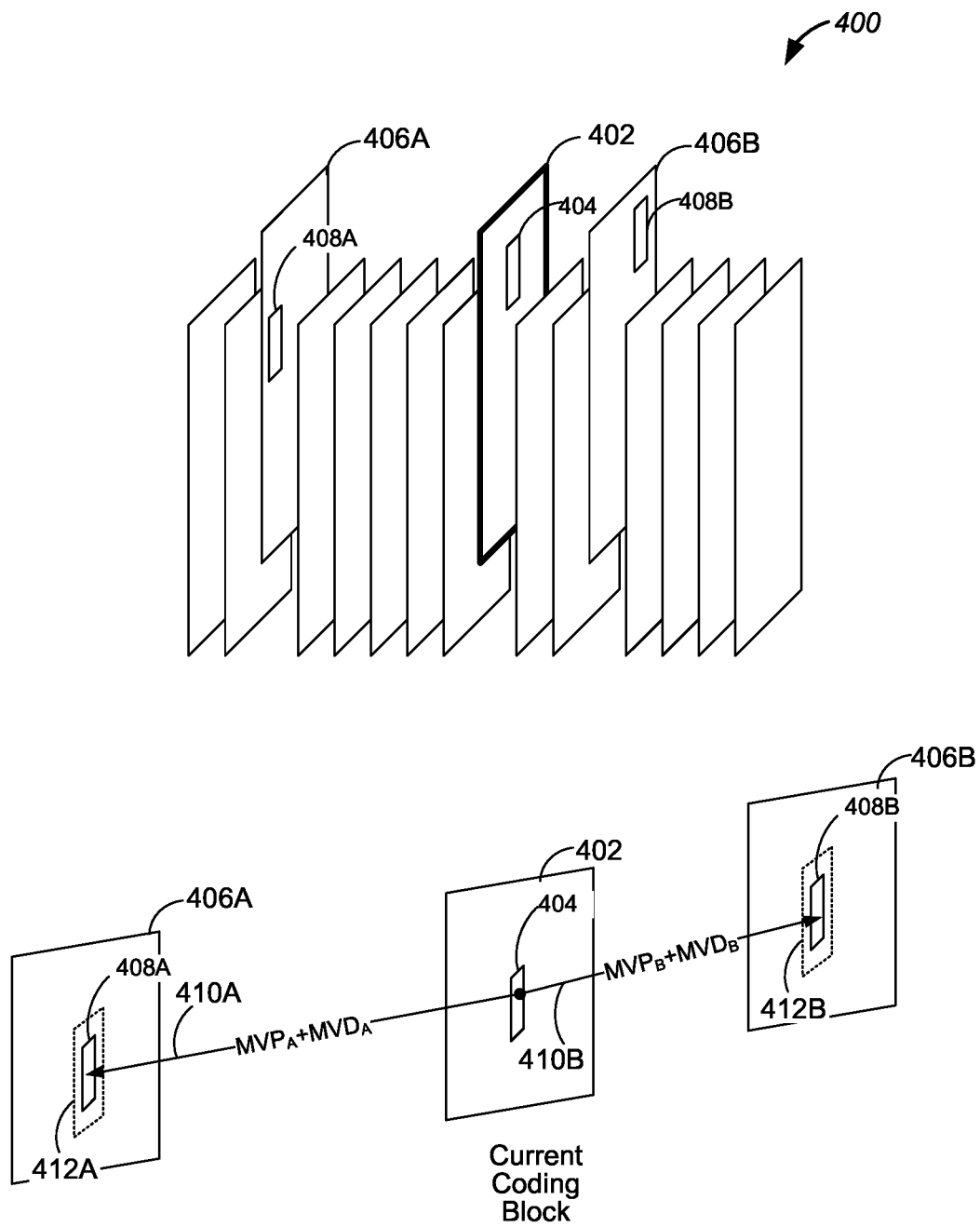
FIG. 4 is a schematic diagram of a bilateral matching configuration associating a current coding block in a GOP with two reference prediction blocks located in the same GOP based on two distinct motion vectors, in accordance with some embodiments.

FIG. 4 is a schematic diagram of a bilateral matching configuration 400 associating a current coding block 404 in a GOP with two reference prediction blocks 408A and 408B located in the same GOP based on two distinct motion vectors 410, in accordance with some embodiments. The GOP includes a sequence of image frames. The sequence of image frames includes a current image frame 402 that further includes the current coding block 404. The current coding block 404 is encoded based on prediction data of one or more coding blocks of one or more reference images in the GOP. In some embodiments, bilateral matching is applied to encode the current coding block 404. For example, the current coding block 404 is encoded based on prediction data of two reference prediction blocks 408A and 408B of two reference frames 406A and 406B in the GOP. In an example, the current coding block 404 is temporally located between a first prediction block 408A (e.g., a forward or backward prediction block) of a first reference frame 406A and a second prediction block 408B (e.g., a backward or forward prediction block) of a second reference frame 406B. One of the reference prediction blocks 408A and 408B precedes the current coding block 404, and the other one of the reference prediction blocks 408A and 408B follows the current coding block 404. Each reference frame 406A or 406B is immediately next to the current image frame 402 or separated from the current image frame 402 by a number of frames. Specifically, the first prediction block 408A optionally precedes or follows the current coding block 404, and is optionally immediately adjacent to, or separated by a number of frames from, the current coding block 404.

In some embodiments, the current coding block 404 is coded based on the two reference prediction blocks 408A and 408B via translational motion. Alternatively, in some embodiments, the current coding block 404 is coded based on the two reference prediction blocks 408A and 408B via warped motion. A motion vector 410A or 410B of the current coding block 404 is adjusted based on warped motion for each subblock or sample of the current coding block 404, before the motion vector 410A or 410B is used to code or predict the subblock or sample based on a respective reference subblock or sample of the prediction block 408A or 408B. In some embodiments associated with bilateral matching, the MVD of the motion vector 410A or 410B is determined adaptively in both of a translational motion mode and a warped motion mode. The motion vector 410A or 410B of the current coding block 404 is a combination of a motion vector prediction MVP (e.g., $MVP_A$ or $MVP_B$) and a MVD (e.g., $MVD_A$ or $MVD_B$). For each of the two reference prediction blocks 408, the MVP is fixed, and the MVD is adaptively encoded, transferred in a bitstream, and decoded for the current coding block 404. In some embodiments, the $MVD_A$ or $MVD_B$ is determined based on a predefined MVD adaptation region (not shown) including a prediction block 408A or 408B identified based on the MVP on a reference frame 406A or 406B, respectively.

In some embodiments, a joint MVD coding mode is implemented to signal a joint MVD for both of the two reference prediction blocks 408A and 408B. For each prediction block 408A or 408B, a respective MVD ($MVD_A$ or $MVD_B$) is derived from the joint MVD, e.g., based on a distance between the reference block and current coding block. In an example, the MVDs of the prediction blocks 408A and 408B are equal to each other.

In some embodiments, the current coding block 404 of the current image frame 402 has the two reference prediction blocks including the first prediction block 408A and the second prediction block 408B. Based on a cost criterion of a difference of the first and second prediction blocks 408A and 408B, an MVD is refined for at least the first prediction block 408B to determine a first refined MVD ($RMVD_A$). The first prediction block 408A is defined based on at least the first refined MVD ($RMVD_A$). Motion compensation data of the current coding block 404 is determined based on the first prediction block 408A and the second prediction block 408B. In some embodiments, the MVD refined to determine the first refined MVD ($RMVD_A$) includes a first MVD ($MVD_A$) associated with the first prediction block 408A. Alternatively, in some embodiments, the MVD refined to determine the first refined MVD ($RMVD_A$) includes a second MVD ($MVD_B$) used by the second prediction block 408B. In some embodiments, such MVD refinement is implemented at both the encoder 106 and the decoder 122. The first refined MVD ($RMVD_A$) is not transmitted with the MVD, and is determined separately during MVD refinement in both the encoder 106 and decoder 122.

In some embodiments, refinement of the MVD is implemented for the first prediction block 408A based on a first MVD refinement region 412A including the prediction block 408A, which is identified on the first reference frame 406A based on a first MVP ($MVP_A$) and the first MVD ($MVD_A$).

The difference between prediction blocks 408A and 408B is determined, and applied as a cost to further determine whether the cost criterion is satisfied. In an example, the first refined MVD (e.g., $RMVD_A$) corresponding to a minimum cost value satisfies the cost criterion and is used to determine the first motion vector 410A of the current coding block 404. In some embodiments, a first refined MVD ($RMVD_A$) is determined for the first prediction block 408A of the first reference frame 406A, and further applied to determine a second refined MVD ($RMVD_B$) of the second reference frame 406B. In an example, the second refined MVD ($RMVD_B$) is mirrored from the first refined MVD ($RMVD_A$) based on distances between the first and second reference frames 406A and 406B and the current image frame 402. In some embodiments, the difference of the first and second prediction blocks 408A and 408B associated with the cost criterion includes one of: a sum of absolute difference (SAD), a sum of squared error (SAE), a sum of absolute transform difference (SATD), and a sum of mean removed SAD.

In some embodiments, the second motion vector 410B of the second prediction block 408B is fixed, while the MVD ($MVD_A$) is refined for the first prediction block 408A based on the cost criterion.

In some embodiments, based on the cost criterion of the difference of the first and second prediction blocks 408A and 408B, an MVD (e.g., $MVD_A$ or $MVD_B$) is refined for the second prediction block 408B to determine a second refined MVD ($RMVD_B$), e.g., concurrently, sequentially or iteratively with refinement of the first refined MVD ($RMVD_A$) of the first prediction block 408A. The second prediction block 408B is generated based on the second refined MVD ($RMVD_B$). In some embodiments, refinement of the MVD is implemented for the second prediction block 408B based on a second MVD refinement region 412B including the prediction block 408B, which is identified on the second reference frame 406B based on a second MVP ($MVP_B$) and the second MVD ($MVD_B$).

In some embodiments, the current coding block 404 is used as a prediction block for a next coding block, and identified for the next coding block based on a next motion vector including a next MVD. The next MVD is not refined for encoding and decoding the next coding block. Stated another way, the current coding block is not used as a prediction block for the next coding block, if the next MVD identifying the current coding block 404 needs to be refined during encoding and decoding of the next coding block.

In some embodiments, the current image frame 402 includes a motion vector predicator identifying an MVP. The first motion vector 410A is determined based on the motion vector predicator and the first refined MVD ($RMVD_A$), and applied to generate the first prediction block 408A. A second motion vector 410B is also determined based on the motion vector predicator and the MVD, and applied to determine the second prediction block 408B in the second reference frame 406B. In some embodiments, the MVD is refined for the first prediction block 408A, in accordance with (1) a determination that the current coding block 404 has one of a group of compound reference modes consisting of NEW_NEARMV, NEW_NEARMV_OPTL, NEAR_NEWMV, and NEAR_NEWMV_OPTL, or (2) a determination that the MVD is obtained for the second prediction block 408B and no MVD is obtained for the first prediction block 408A.

Specifically, in some embodiments associated with NEW_NEARMV or its variant NEW_NEARMV_OPTL, a motion vector predictor is signaled by an MVP index to select a motion vector prediction (MVP) in a list of pre-defined MVPs. A first MVD ($MVD_A$) is sent in a bitstream to the decoder 122 jointly with the motion vector predicator. In some embodiments associated with NEW_NEWMV or its variant NEW_NEWMV_OPTL, a motion vector predictor is signaled by an MVP index to select an MVP in a list of predefined MVPs. A first MVD ($MVD_A$) and a second MVD ($MVD_B$) are sent in a bitstream to the decoder 122 jointly with the motion vector predicator.

In some embodiments, in accordance with a determination that the current coding block has one of a group of compound reference modes consisting of NEAR_NEAR_MV and NEAR_NEAR_OPTL, the first prediction block 408A is identified among the two reference prediction blocks 408A and 408B based on a condition, before the MVD is refined for the first prediction block 408A. For example, in accordance with the condition, one of the two reference prediction blocks 408A and 408B, which is closer to the current image frame 402 is selected as the first prediction block 408A for MVD refinement. The first MVD ($MVD_A$) that is refined to generate the first refined MVD ($RMVD_A$) optionally precedes or follows the current coding block 404. Stated another way, MVD refinement may be applied to any of the backward prediction block or the forward prediction block in the bilateral matching scheme of the inter prediction of video data.

Figure 5A:
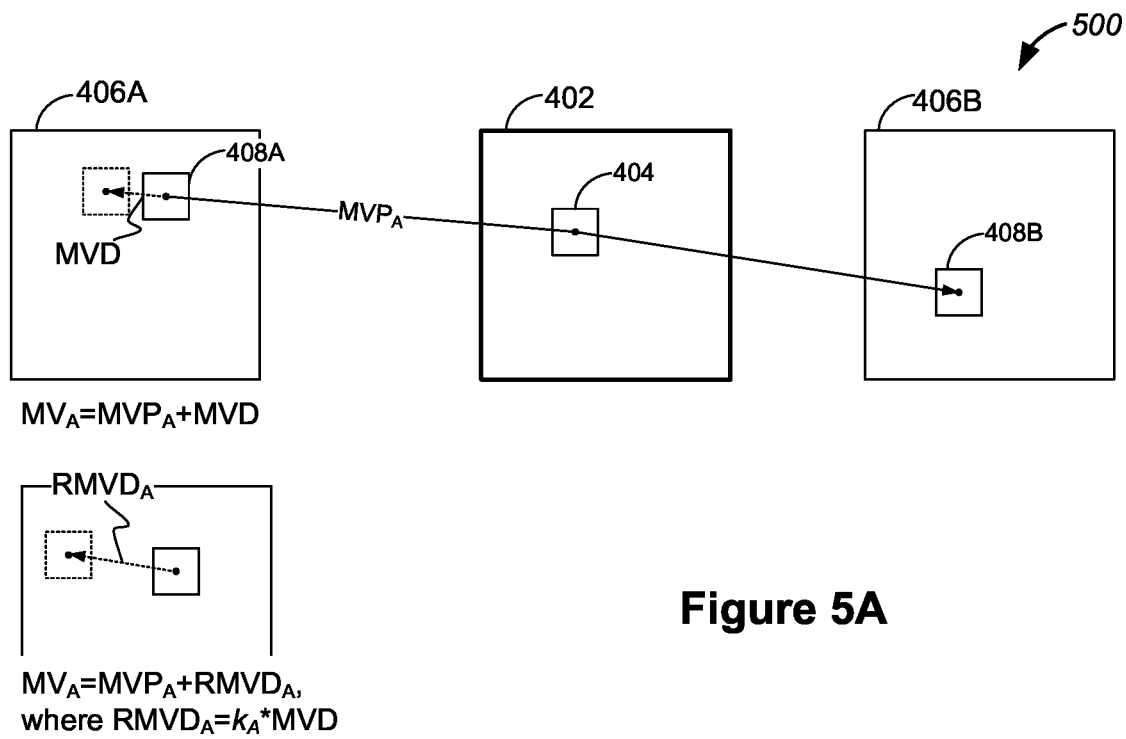
FIG. 5A is a schematic diagram of an example bilateral matching configuration in which an MVD associated with a reference prediction block is refined, in accordance with some embodiments.
Figure 5B:
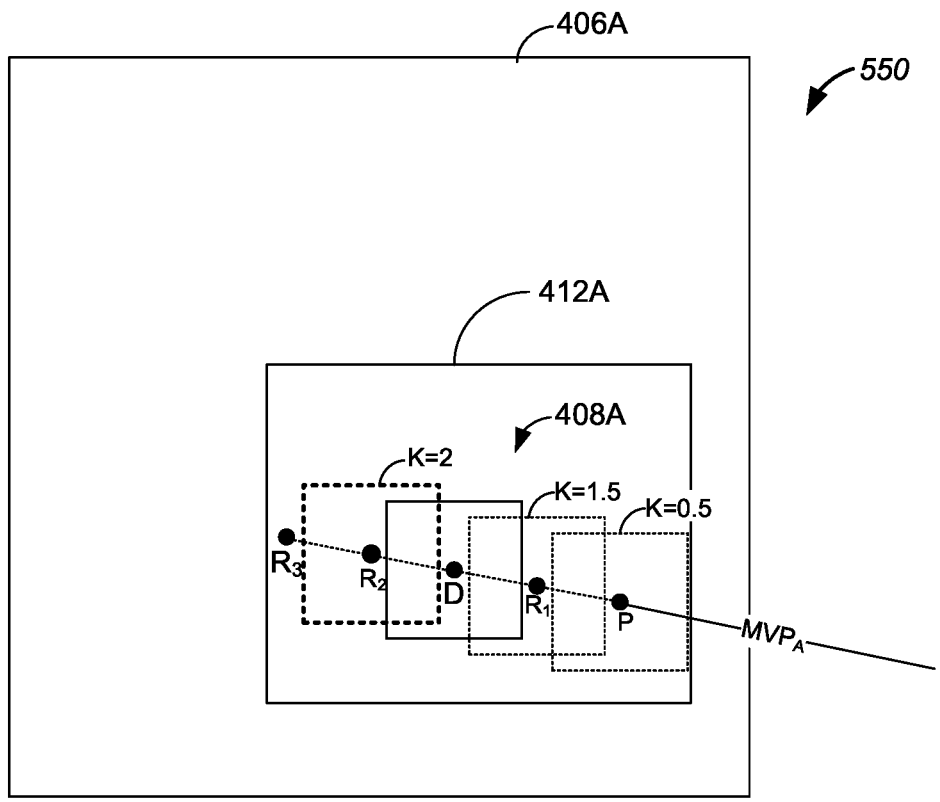
FIG. 5B illustrates an example process of refining an MVD associated with a reference prediction block within an MVD refinement region, in accordance with some embodiments.

FIG. 5A is a schematic diagram of an example bilateral matching configuration 500 in which an MVD associated with a reference prediction block 408A or 408B is refined, in accordance with some embodiments, and FIG. 5B illustrates an example process 550 of refining an MVD associated with a reference prediction block 408A or 408B within an MVD refinement region 412A, in accordance with some embodiments. A current coding block 404 of a current image frame 402 has two reference prediction blocks including a first prediction block 408A and a second prediction block 408B. Based on a cost criterion of a difference of the first and second prediction blocks 408A and 408B, an MVD is refined for at least the first prediction block 408B to determine a first refined MVD ($RMVD_A$). The first prediction block 408A is defined based on at least the first refined MVD ($RMVD_A$). Motion compensation data of the current coding block 404 is determined based on the first prediction block 408A and the second prediction block 408B. It is noted that the MVD refined to determine the first refined MVD ($RMVD_A$) is optionally a first MVD ($MVD_A$) associated with the first prediction block, a second MVD ($MVD_B$) associated with the second prediction block 408B, or a joint MVD used in a joint MVD coding mode. In some embodiments, such MVD refinement is implemented at both the encoder 106 and the decoder 122. The MVD is adaptively determined and transmitted to the decoder 122. The first refined MVD ($RMVD_A$) is not transmitted with the MVD, and is determined separately during MVD refinement in both the encoder 106 and decoder 122.

In some embodiments, the first prediction block 408A is determined based on a first motion vector $MV_A$, which is a sum of a first MVP ($MVP_A$) and a first refined MVD ($RMVD_A$). The MVD is scaled by a scale factor $K_A$ to generate the first refined MVD ($RMVD_A$). The scale factor $K_A$ is identified in the example MVD refinement process 550. Referring to FIG. 5B, in some embodiments, the MVD is refined with a plurality of predefined scale factors K to generate a plurality of scaled MVDs for the first prediction block 408A. For example, the plurality of scaled MVDs includes $PR_1$ corresponding to a first scale factor (K=0.5), PD corresponding to a unity scale factor (K=1), $PR_2$ corresponding to a second scale factor (K=1.5), and $PR_3$ corresponding to a third scale factor (K=2). In some embodiments, the plurality of predefined scale factors correspond to a scale factor range (e.g., 0.5-2), and the resulting prediction block 408A is controlled within the MVD refinement range 412A. A difference of the first and second prediction blocks 408A and 408B corresponding to one of the plurality of scaled MVDs (e.g., PD) satisfies the cost criterion. In some embodiments, the difference of the first and second prediction blocks 408A and 408B corresponding to the one of the plurality of scaled MVDs (e.g., $PR_2$, which corresponds to K=1.5) is smaller than differences of the prediction blocks 408A and 408B corresponding to any other scaled MVD (e.g., PD, $PR_1$, and $PR_3$). The one of the plurality of scaled MVDs is identified as the first refined MVD ($RMVD_A$) of the first prediction block 408A. By these means, the first motion vector 410A of the first prediction block 408B is further determined based on a motion vector predicator (e.g., $MVP_A$) and the first refined MVD ($RMVD_A$).

More specifically, in some embodiments, a plurality of differences of the first and second prediction blocks 408A and 408B is determined for the plurality of predefined scale factors. Each difference corresponds to a respective one of the plurality of scaled MVDs of the first prediction block 408A. The plurality of differences are compared to one another to determine whether each difference satisfies the cost criterion. Further, in some embodiments, one or more preferred scale factors (e.g., K=2) are more preferred or less preferred over other scale factors. A first subset of differences of the prediction blocks 408A and 408B is determined based on a first subset of predefined scale factors of the MVD. Before comparing the plurality of differences, each of the first subset of differences is scaled with a respective difference factor. In some embodiments, the difference factor is less than 1, and the first subset of predefined scale factors is more preferred compared with the remaining predefined scale factors. For example, the difference of the prediction blocks 408A and 408B corresponding to K=2 is scaled by 0.8, and has a higher chance of being smaller than the difference that are not scaled or scaled by a difference factor greater than 1. Conversely, in some embodiments, the difference factor is less than 1, and the first subset of predefined scale factors is less preferred compared with the remaining predefined scale factors.

Figure 6:
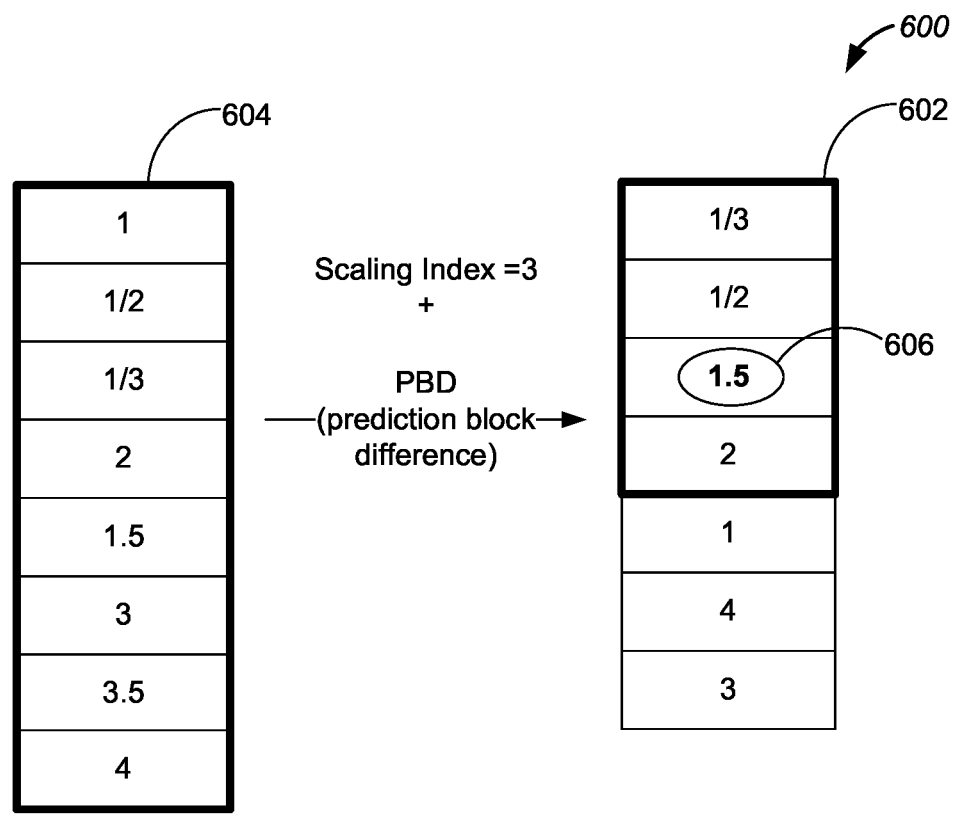
FIG. 6 illustrates an example process of refining an MVD associated with a reference prediction block based on a scale factor range and a scaling index, in accordance with some embodiments.

FIG. 6 illustrates an example process 600 of refining an MVD associated with a reference prediction block 408A based on a scale factor range and a scaling index, in accordance with some embodiments. The current image frame 402 includes the scaling index for refinement of the MVD of the prediction block 408A. The scaling index identifies a scale factor $K_A$ in an ordered sequence of scale factors 602. The encoder 106 encodes the current image frame 402 with the scaling index. Based on the scaling index, the decoder 122 selects the scale factor $K_A$ in the ordered sequence of scale factors 602, refines the MVD of the prediction block 408A based on the selected scale factor $K_A$, and generates the motion vector corresponding to the prediction block 408A based on a refined first MVD ($RMVD_A$).

In some embodiments, the MVD is scaled with a plurality of predefined scale factors 604 (e.g., K=1, ½, ⅓, 2, 1.5, 3, and 4) to generate a plurality of scaled MVDs for the first prediction block 408A. A plurality of differences of the first and second prediction blocks 408A and 408B is determined, and each difference corresponds to a respective predefined scale factor and a respective one of the plurality of scaled MVDs of the first prediction block 408A. A subset of predefined scale factors is arranged into the ordered sequence of scale factors 602 based on the plurality of differences. In some embodiments, the ordered sequence of scale factors 604 is not sent from the encoder 106 to the decoder 122. The current coding block 404 is associated with the scaling index (e.g., 3) identifying the scaling factor $K_A$ in the ordered sequence of scale factors 604. Based on the scaling index, one of the subset of predefined scale factors $K_A$ is selected to scale the MVD and generate the first refined MVD ($RMVD_A$).

Figure 7A:
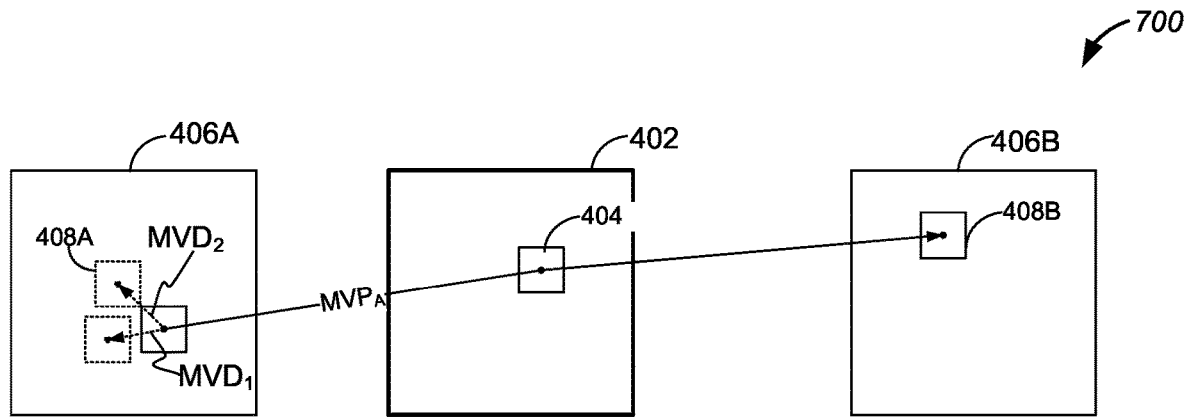
FIG. 7A is a schematic diagram of another example bilateral matching configuration in which an MVD associated with a reference prediction block is refined, in accordance with some embodiments.
Figure 7B:
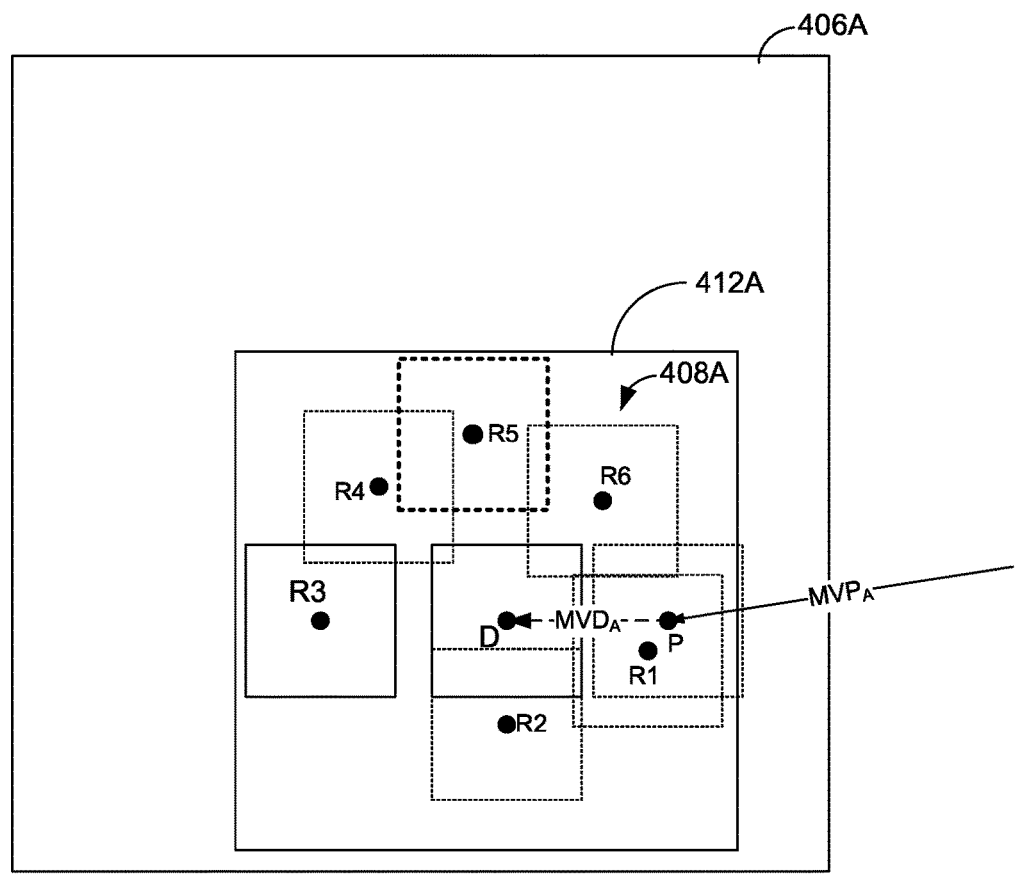
FIG. 7B illustrates another example process of refining an MVD associated with a reference prediction block within an MVD refinement region, in accordance with some embodiments.

FIG. 7A is a schematic diagram of another example bilateral matching configuration 700 in which an MVD of a reference prediction blocks 408A or 408B is refined, in accordance with some embodiments, and FIG. 7B illustrates another example process 750 of refining an MVD of a reference prediction block 408A or 408B within an MVD refinement region 412A, in accordance with some embodiments. A current coding block 404 of a current image frame 402 has two reference prediction blocks including a first prediction block 408A and a second prediction block 408B. Each prediction block 408A or 408B optionally precedes or follows the current coding block 404 in a GOP. Based on a cost criterion of a difference of the prediction blocks 408A and 408B, an MVD is refined for at least the first prediction block 408B to determine a first refined MVD ($RMVD_A$). The first prediction block 408A is defined based on at least the first refined MVD ($RMVD_A$), and is applied with the second prediction block 408B to determine motion compensation data of the current coding block 404. In some embodiments, the MVD is adaptively determined and transmitted from the encoder 106 to the decoder 122 (FIG. 1), while the first refined MVD ($RMVD_A$) is not transmitted with the MVD. The first refined MVD ($RMVD_A$) is determined separately during MVD refinement in both the encoder 106 and decoder 122.

In some embodiments, the first prediction block 408A is determined based on a first motion vector $MV_A$, which is a sum of a first MVP ($MVP_A$), a first MVD ($MVD_A$), and a first refined MVD ($RMVD_A$). The first prediction block 408A is refined in the MVD refinement region 412A of the first reference frame 406A to identify the first motion vector $MV_A$. Referring to FIG. 7B, in some embodiments, a plurality of predefined motion vector refinements R1-R6 is identified, e.g., in the MVD refinement region 412, for refining the MVD for the first prediction block 408A. A difference of the first and second prediction blocks 408A and 408B corresponding to one of the plurality of predefined motion vector refinements R5 satisfies the cost criterion. In some embodiments, the difference of the first and second prediction blocks 408A and 408B corresponding to the one of the plurality of predefined motion vector refinements (e.g., $R_5$) is smaller than differences of the prediction blocks 408A and 408B corresponding to any other motion vector refinement (e.g., R1-R4 and R6). The one of the plurality of predefined motion vector refinements is identified as the first refined MVD ($RMVD_A$) of the first prediction block 408A. By these means, the first motion vector 410A of the first prediction block 408B is determined based on a motion vector predicator (e.g., $MVP_A$), the first MVD ($MVD_A$), and the first refined MVD ($RMVD_A$).

In some embodiments, the plurality of predefined motion vector refinements R1-R6 is included in a given search area surrounding a motion vector defined by a motion vector predicator and the MVD of the first prediction block 408A. For example, referring to FIG. 7B, the MVD refinement region 412A is the given search area centered at a location corresponding to the MVD, and the predefined motion vector refinements R1-R6 are distributes in different directions of the MVD. Further, in some embodiments, the give search area (e.g., MVD refinement region 412A) is restricted within an offset from the motion vector (e.g., within a range of 100 pixels from D, which corresponds to the MVD).

In some embodiments, the give search area (e.g., MVD refinement region 412A) is restricted to one or more predefined directions of the motion vector. For example, each center of the motion vector refinements R1-R6 is aligned with D corresponding to the MVD along a horizontal direction, a vertical direction, or a diagonal direction having a tilting angle (e.g., 45 degrees). Further, in some situations, the given search area of MVD refinement depends on the MVD. For example, in accordance with a determination that a direction of the MVD is along one of a horizontal direction (e.g., R3) and a vertical direction, an MVD refining direction for the first prediction block 408A is limited to the one of the horizontal direction and the vertical direction. In some embodiments, in accordance with a determination that a direction of the motion vector difference (e.g., $MVD_A$) is along a first direction (e.g., left), an MVD refining direction for the first prediction block 408A is selected to be identical (e.g., R3) to or perpendicular (e.g., R2) with the first direction.

Additionally, in some embodiments, a plurality of differences of the first and second prediction blocks 408A and 408B are determined. Each difference corresponds to a respective one of the plurality of predefined motion vector refinements R1-R6 of the first prediction block 408A. The plurality of differences are compared to one another to determine whether each difference satisfies the cost criterion. Further, in some embodiments, one or more predefined motion vector refinements are preferred over other motion vector refinements. A first subset of differences of the prediction blocks 408A and 408B is determined based on a first subset of predefined motion vector refinements. Before comparing the plurality of the differences, each of the first subset of differences is scaled with a respective difference factor. In some embodiments, the difference factor is greater than 1, and the first subset of predefined motion vector refinements is less preferred compared with remaining predefined motion vector refinements. Conversely, in some embodiments, the difference factor is less than 1, and the first subset of predefined motion vector refinements is more preferred compared with the remaining predefined motion vector refinements. In an example, the difference of the prediction blocks 408A and 408B corresponding to R5 is scaled by 0.8, and has a higher chance of being smaller than the difference that are not scaled or scaled by a difference factor greater than 1.

Figure 8:
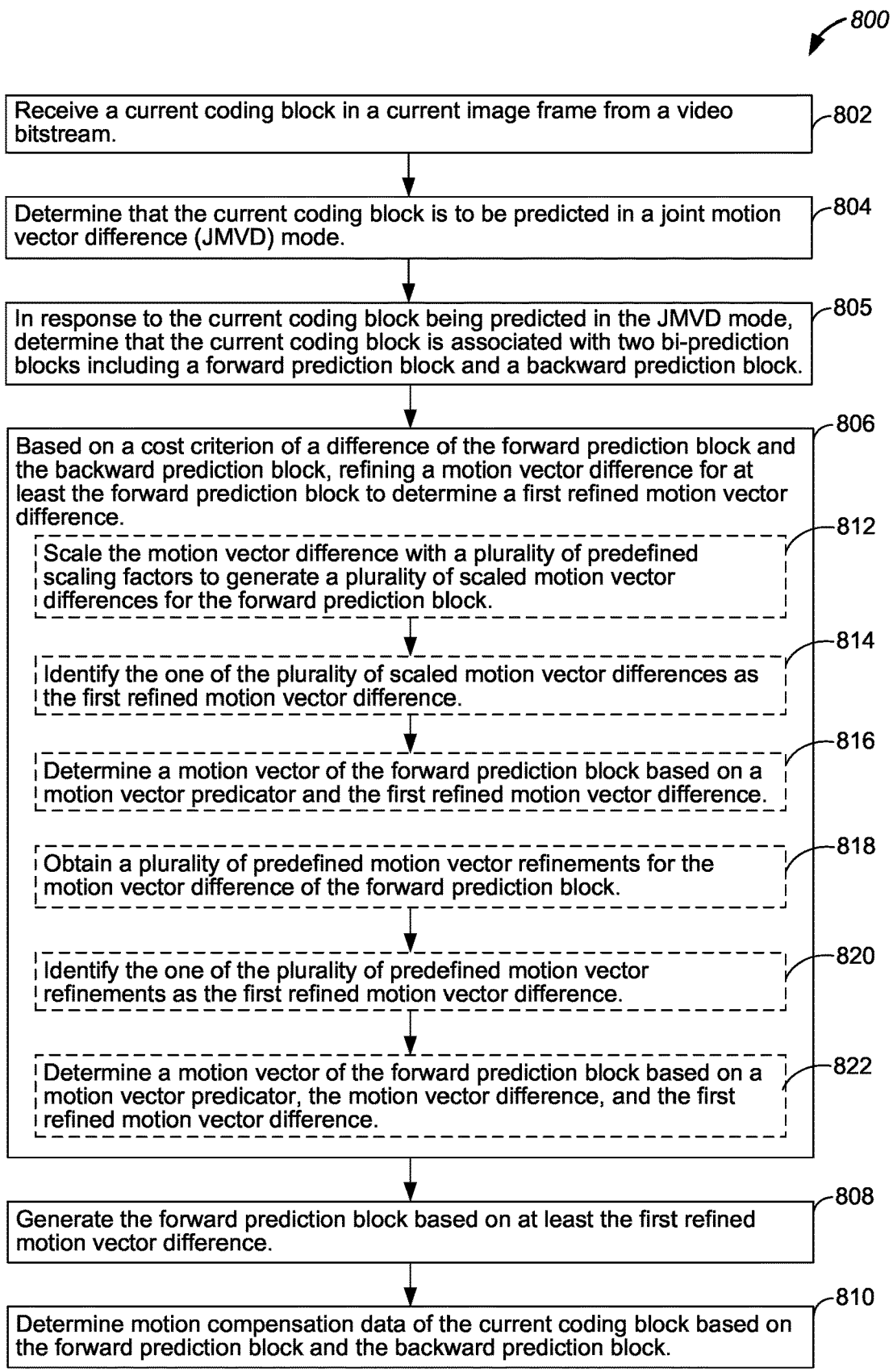
FIG. 8 is a flow diagram of a method of coding video, in accordance with some embodiments.

FIG. 8 is a flow diagram illustrating a method of coding video, in accordance with some embodiments. The method 800 may be performed at a computing system (e.g., the server system 112, the source device 102, or the electronic device 120) having control circuitry and memory storing instructions for execution by the control circuitry. In some embodiments, the method 800 is performed by executing instructions stored in the memory (e.g., the coding module 320 of the memory 314) of the computing system. In some embodiments, a current image frame 402 includes (802) a current coding block 404. Bilateral matching (e.g., a JVVD mode) is employed (804) to refine an MVD of one of two reference frame lists (e.g., reference prediction blocks 408A and 408B on reference frames 406A and 406B in FIG. 4) corresponding (805) to the current coding block 404, when a joint MVD coding mode is selected when MVDs are jointly signaled for the two reference frame lists of the current coding block 404.

In some embodiments, a list of pre-defined scale factors K (FIG. 5) is used to refine the MVD for the first predication block 408A (e.g., a forward prediction block) from the signaled joint MVD. Bilateral matching is employed to derive a scale factor $K_A$ from the list of pre-defined scale factors K. In some embodiments, the prediction block 408A or 408B is generated with a motion vector equal to a sum of a motion vector prediction and an MVD signaled to the decoder 122 for the prediction block 408A or 408B. Conversely, for each candidate scale factor in the pre-defined list, a candidate prediction block 408B or 408A is generated with a candidate motion vector equal to a sum of the motion vector prediction and a scaled MVD for the MVD signaled for the other prediction block 408A or 408B. Differences between the two prediction blocks 408A and 408B are determined for the list of the pre-defined scale factors K, and measured by a cost criterion. The scale factor with the minimum cost (corresponding to the smallest difference) is used as the scale factor $K_A$ (pred_scale_factor).

As such, in some embodiments, the MVD is refined (806) for at least the first prediction block 408A to determine a first refined MVD ($RMVD_A$) based on the cost criterion of the difference of the first and second prediction blocks. The first prediction block 408A is generated (808) based on at least the first MVD ($RMVD_A$), and used jointly with the second prediction block 408B (e.g., a backward prediction block) to determine (810) motion compensation data of the current coding block 404.

In some embodiments, a motion vector 410A (or 410B) of the prediction block 408A (or 408B) is equal to a sum of MVP and a signaled MVD for one reference frame list. For each candidate scale factor in a pre-defined list of scale factors 604, a motion vector 410B (or 410A) of the prediction block 408B (or 408A) is equal to the sum of MVP and scaled MVDs for the other reference frame list, and the difference between the prediction block 408A and 408B are calculated and measured by a cost criterion. A subset of candidate scale factors 602 associated with the lowest N cost values are used as the available scale factors that are optionally signaled, where N is a positive integer (e.g., 1, 2, 3, 4, . . . , 8). In an example (FIG. 6), the full set of candidates scale factors in the pre-defined list 604 includes 8 different scale factors, and the subset of 4 scale factors 602 associated with the lowest 4 cost values can be selected for the current coding block 404. An index 606 with a value range from 0 to 3 is signaled to indicate which one of the 4 scale factors is used for the current coding block 404.

Alternatively, in some embodiments, the prediction block 408A or 408B is generated with a motion vector 410A or 410B equal to the sum of the motion vector prediction (MVP) and MVD for one reference frame list. Then, for each MVD in an allowed/given search area 412A or 412B surrounding the MV of the other reference frame list, the prediction block 408B or 408A is generated with a motion vector 410B or 410A equal to the sum of MVP, MVD, and refined MVD. A difference between the prediction blocks 408A and 408B are calculated and measured by a cost criterion, and the refined MVD with the minimum cost is used as the refined MVD for the current coding block 404. Further, in an example, a search for the refined MVD is restricted to certain directions and/or offsets.

In some embodiments, the cost criterion includes, but is not limited to, SAD (sum of absolute difference), SSE (sum of squared error), SATD (sum of absolute transform difference), and sum of mean removed SAD.

In some embodiments, a distortion cost of one or more positions or pre-defined scale factors is modified by a difference factor, to make the position(s) more or less preferable during comparison. When the factor is larger than 1, the position is less preferred. When the factor is smaller than 1, the position is more preferred. Stated another way, the MVD is refined based on a plurality of predefined scale factors K (FIG. 5B) or a plurality of motion vector refinements R1-R6 (FIG. 7B). In some embodiments, the refined MVD is determined based on a difference of the prediction blocks 408A and 408B corresponding to each scale factor. Alternatively, in some embodiments, the refined MVD is determined based on a difference of the prediction blocks 408A and 408B corresponding to each motion vector refinement. In some embodiments, in accordance with a determination that one of the predefined scale factors K or motion vector refinements R1-R6 is preferred, the corresponding difference of the prediction blocks 408A and 408B is scaled by a difference factor that is less than 1. Alternatively and conversely, in some embodiments, in accordance with a determination that one of the predefined scale factors K or motion vector refinements R1-R6 is less preferred, the corresponding difference of the prediction blocks 408A and 408B is scaled by a difference factor that is greater than 1. In some embodiments, regardless of whether the difference factor is greater or less than 1, the lower the difference factor, the more preferred the corresponding refined MVD. In some embodiments, application of the difference factor reduces computational complexity of MVD refinement.

In some embodiments, the refined MVD (e.g., $RMVD_A$) determined by bilateral matching is not used for MVP list construction of an additional coding block in the current image frame, a next image frame using the current image frame as a reference frame, or both. Stated another way, the current coding block 404 is reconstructed based on the refined MVD determined by bilateral matching, and is not used as a prediction block for a next coding block that requires refining of a next MVD identifying the current coding block as the prediction block. The next coding block is optionally in the same current image frame 402 or in a distinct frame in the same GOP as the current image frame 402.

In some embodiments, a searching direction for MV refinement with bilateral matching depends on a direction of MVD. In some embodiments, if the direction of MVD is along a horizontal or vertical direction, the searching direction for MV refinement with bilateral matching is also restricted to the horizontal or vertical direction. In some embodiments, the searching direction for MV refinement with bilateral matching is substantially parallel (including parallel) or perpendicular to the direction of the MVD.

Additionally, in some embodiments, a NEW_NEARMV (or its variant NEW_NEARMV_OPTL) mode or a NEAR_NEWMV (or its variant NEAR_NEWMV_OPTL) mode is selected for the current coding block 404. There is an MVD for one reference frame list, but no MVD is available for the other reference frame list. Bilateral matching is employed to refine the MVD for the reference frame list with no MVD.

In some embodiments, a NEAR_NEAR_MV (or its variant NEAR_NEAR_OPTL) mode is selected for the current coding block 404. Bilateral matching based MVD refinement is applied to one of the motion vectors of the two prediction blocks 408A and 408B. Optionally, the one of the motion vectors of the two prediction blocks 408A and 408B, which is selected for refinement, is pre-defined according to a condition on the encoder 106 and the decoder 122. Optionally, the one of the motion vectors of the two prediction blocks 408A and 408B, which is selected for refinement, is signaled between the encoder 106 and the decoder 122. For example, in accordance with the condition, one of the two prediction blocks 408A and 408B, which is closer to the current image frame 402 is selected for MVD refinement.

Although FIG. 8 illustrates a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments.

(A1) In one aspect, some embodiments include a method 800 for processing (e.g., decoding) video data. The method 800 includes receiving (802) a current coding block in a current image frame from a video bitstream; determining (804) that the current coding block is to be predicted in a joint motion vector difference (JMVD) mode; in response to the current coding block being predicted in the JMVD mode, determining (805) that the current coding block is associated with two bi-prediction blocks including a forward prediction block and a backward prediction block; based on a cost criterion of a difference of the forward prediction block and the backward prediction block, refining (806) a motion vector difference for at least the forward prediction block to determine a first refined motion vector difference; generating (808) the forward prediction block based on at least the first refined motion vector difference; and determining (810) motion compensation data of the current coding block based on the forward prediction block and the backward prediction block (A2) In some embodiments of A1, refining the motion vector difference for at least the forward prediction block further includes scaling (812) the motion vector difference with a plurality of predefined scale factors to generate a plurality of scaled motion vector differences for the forward prediction block, determining that a difference of the forward prediction block and the backward prediction block corresponding to one of the plurality of scaled motion vector differences satisfies the cost criterion, identifying (814) the one of the plurality of scaled motion vector differences as the first refined motion vector difference, and determining (816) a motion vector of the forward prediction block based on a motion vector predicator and the first refined motion vector difference.

(A3) Further, in some embodiments of A2, refining the motion vector difference for at least the forward prediction block further includes determining a plurality of differences of the forward prediction block and backward prediction block and comparing the plurality of differences to determining whether each difference satisfies the cost criterion. Each difference corresponds to a respective one of the plurality of scaled motion vector differences of the forward prediction block.

(A4) Additionally, in some embodiments of A3, determining the plurality of differences further includes determining a first subset of differences based on a first subset of predefined scale factors of the motion vector difference, and before comparing the plurality of the differences, modifying the first subset of differences with a difference factor. (A5) In some embodiments of A4, the difference factor is less than 1.

(A6) In some embodiments of A1, refining the motion vector difference for at least the forward prediction block further includes obtaining (818) a plurality of predefined motion vector refinements for the motion vector difference of the forward prediction block, determining that a difference of the forward prediction block and the backward prediction block corresponding to one of the plurality of predefined motion vector refinements satisfies the cost criterion, identifying (820) the one of the plurality of predefined motion vector refinements as the first refined motion vector difference, and determining (822) a motion vector of the forward prediction block based on a motion vector predicator, the motion vector difference, and the first refined motion vector difference. (A7) Further, in some embodiments of A6, the plurality of predefined motion vector refinements is included in a given search area surrounding a motion vector defined by a motion vector predicator and the motion vector difference. (A8) Additionally, in some embodiments of A7, the give search area is restricted within an offset from the motion vector or one or more predefined directions of the motion vector.

(A9) Additionally, in some embodiments of A6-A8, refining the motion vector difference for at least the forward prediction block further includes determining a plurality of differences of the forward prediction block and the backward prediction block and comparing the plurality of differences to determining whether each difference satisfies the cost criterion. Each difference corresponds to a respective one of the plurality of predefined motion vector refinements of the forward prediction block. (A10) Further, in some embodiments of A9, determining the plurality of differences further includes determining a first subset of differences based on a first subset of predefined scale factors of the motion vector difference, and before comparing the plurality of the differences, modifying the first subset of differences with a difference factor. (A11) In some embodiments of A10, the difference factor is greater than 1.

(A12) In some embodiments of A1, the current image frame includes a scaling index. Refining the motion vector difference for at least the forward prediction block further includes scaling the motion vector difference with a plurality of predefined scale factors to generate a plurality of scaled motion vector differences for the forward prediction block, determining that a plurality of differences of the forward prediction block and the backward prediction block, arranging a subset of predefined scale factors into an ordered sequence of scale factors based on the plurality of differences, and based on the scaling index, selecting one of the subset of predefined scale factors to scale the motion vector difference and generate the first refined motion vector difference. Each difference corresponds to a respective one of the plurality of scaled motion vector differences of the forward prediction block.

(A13) In some embodiments of A1-A12, the difference of the forward prediction block and the backward prediction block associated with the cost criterion includes one of: a sum of absolute difference (SAD), a sum of squared error (SAE), a sum of absolute transform difference (SAID), and a sum of mean removed SAD.

(A14) In some embodiments of A1-A13, the current image frame includes a motion vector predicator. The method 800 further includes determining a second motion vector based on the motion vector predicator and the motion vector difference and generating the backward prediction block in a second image frame based on the second motion vector. Generating the forward prediction block based on the first refined motion vector difference further includes determining a first motion vector based on the motion vector predicator and the first refined motion vector difference and generating the forward prediction block based on the first motion vector.

(A15) In some embodiments of A1-A14, the method 800 further includes fixing a second motion vector of the backward prediction block while refining the motion vector difference for the forward prediction block based on the cost criterion.

(A16) In some embodiments of A1-A14, the method 800 further includes based on the cost criterion of the difference of the forward prediction block and the backward prediction block, refining the motion vector difference for the backward prediction block to determine a second refined motion vector difference. The method 800 further includes generating the backward prediction block based on the second refined motion vector difference.

(A17) In some embodiments of A1-A16, the current coding block is not used as a prediction block for a next coding block that requires refining of a next motion vector difference for the current coding block.

(A18) In some embodiments of A1-A17, the method 800 further includes in accordance with a determination that a direction of the motion vector difference is along one of a horizontal direction and a vertical direction, restricting a refining direction for the forward prediction block to the one of the horizontal direction and the vertical direction.

(A19) In some embodiments of A1-A17, the method 800 further includes in accordance with a determination that a direction of the motion vector difference is along a first direction, selecting a refining direction for the forward prediction block to be identical to or perpendicular with the first direction.

(A20) In some embodiments of A1-A19, the motion vector difference is refined for the forward prediction block, in accordance with (1) a determination that the current coding block has one of a group of compound reference modes consisting of NEW_NEARMV, NEW_NEARMV_OPTL, NEAR_NEWMV, and NEAR_NEWMV_OPTL, or (2) a determination that the motion vector difference is obtained for the backward prediction block and no motion vector difference is obtained for the forward prediction block.

(A21) In some embodiments of A1-A19, the method 800 further includes in accordance with a determination that the current coding block has one of a group of compound reference modes consisting of NEAR_NEAR_MV and NEAR_NEAR_OPTL, identifying the forward prediction block among the two bi-prediction blocks based on a condition, before refining the motion vector difference for the forward prediction block.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A18 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A18 above).

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for decoding video data, comprising:
   receiving a current coding block in a current image frame from a video bitstream, the video bitstream including a selection index;
   determining that the current coding block is to be predicted in a joint motion vector difference (JMVD) mode;
   in response to the current coding block being predicted in the JMVD mode, determining that the current coding block is associated with two bi-prediction blocks including a forward prediction block and a backward prediction block;
   based on a cost criterion of a difference of the forward prediction block and the backward prediction block, refining a motion vector difference for at least the forward prediction block, further including:
      determining a plurality of candidate differences of the forward prediction block and the backward prediction block based on a plurality of scaled candidate motion vector differences for the forward prediction blocks; and
      based on the selection index, determining a first refined motion vector difference based on one of the plurality of candidate differences;
   generating the forward prediction block based on at least the first refined motion vector difference; and
   determining motion compensation data of the current coding block based on the forward prediction block and the backward prediction block.

2. The method of claim 1, refining the motion vector difference for at least the forward prediction block comprising:
   scaling the motion vector difference with a plurality of predefined scale factors to generate a plurality of scaled motion vector differences for the forward prediction block, wherein the one of the plurality of candidate differences of the forward prediction block and backward prediction block corresponding to one of the plurality of scaled motion vector differences satisfies the cost criterion;
   identifying the one of the plurality of scaled motion vector differences as the first refined motion vector difference; and
   determining a motion vector of the forward prediction block based on a motion vector predicator and the first refined motion vector difference.

3. The method of claim 2, refining the motion vector difference for at least the forward prediction block comprising:
   comparing the plurality of candidate differences to determine whether each difference satisfies the cost criterion.

4. The method of claim 3, determining the plurality of candidate differences further comprising:
   determining a first subset of differences based on a first subset of predefined scale factors of the motion vector difference; and
   before comparing the plurality of candidate differences, modifying the first subset of differences with a difference factor.

5. The method of claim 1, refining the motion vector difference for at least the forward prediction block comprising:
   obtaining a plurality of predefined motion vector refinements for the motion vector difference of the forward prediction block,
   wherein the one of the plurality of candidate differences of the forward prediction block and the backward prediction block corresponding to one of the plurality of predefined motion vector refinements satisfies the cost criterion;
   identifying the one of the plurality of predefined motion vector refinements as the first refined motion vector difference; and
   determining a motion vector of the forward prediction block based on a motion vector predicator, the motion vector difference, and the first refined motion vector difference.

6. The method of claim 5, wherein the plurality of predefined motion vector refinements is included in a given search area surrounding a motion vector defined by a motion vector predicator and the motion vector difference.

7. The method of claim 6, wherein the given search area is restricted within an offset from the motion vector or one or more predefined directions of the motion vector.

8. The method of claim 5, wherein:
   each of the plurality of candidate differences of the forward prediction block and backward prediction block corresponds to a respective one of the plurality of predefined motion vector refinements of the forward prediction block; and
   refining the motion vector difference for at least the forward prediction block further includes comparing the plurality of candidate differences to determine whether each difference satisfies the cost criterion.

9. The method of claim 8, determining the plurality of candidate differences further comprising:
   determining a first subset of differences based on a first subset of predefined motion vector refinements; and
   before comparing the plurality of the differences, modifying the first subset of differences with a difference factor.

10. The method of claim 1, wherein the selection index of the current image frame includes a scaling index, refining the motion vector difference for at least the forward prediction block further comprising:
    scaling the motion vector difference with a plurality of predefined scale factors to generate the plurality of scaled motion vector differences for the forward prediction block; wherein each of the plurality of differences of the forward prediction block and the backward prediction block corresponds to a respective one of the plurality of scaled motion vector differences of the forward prediction block;
    arranging a subset of predefined scale factors into an ordered sequence of scale factors based on the plurality of differences; and
    based on the scaling index, selecting one of the subset of predefined scale factors to scale the motion vector difference and generate the first refined motion vector difference.

11. The method of claim 1, wherein the current image frame includes a motion vector predicator, the method further comprising:
    determining a second motion vector based on the motion vector predicator and the motion vector difference;
    generating the backward prediction block in a second image frame based on the second motion vector; and
    wherein generating the forward prediction block based on the first refined motion vector difference further includes determining a first motion vector based on the motion vector predicator and the first refined motion vector difference and generating the forward prediction block based on the first motion vector.

12. The method of claim 1, further comprising:
fixing a second motion vector of the backward prediction block while refining the motion vector difference for the forward prediction block based on the cost criterion.

13. A computing system, comprising:
control circuitry; and
memory storing one or more programs configured to be executed by the control circuitry, the one or more programs further comprising instructions for:
receiving a current coding block in a current image frame from a video bitstream, the video bitstream including a selection index;
determining that the current coding block is to be predicted in a joint motion vector difference (JMVD) mode;
in response to the current coding block being predicted in the JMVD mode, determining that the current coding block is associated with two bi-prediction blocks including a forward prediction block and a backward prediction block;
based on a cost criterion of a difference of the forward prediction block and the backward prediction block, refining a motion vector difference for at least the forward prediction block, further including:
determining a plurality of candidate differences of the forward prediction block and the backward prediction block based on a plurality of scaled candidate motion vector differences for the forward prediction blocks; and
based on the selection index, determining a first refined motion vector difference based on one of the plurality of candidate differences;
generating the forward prediction block based on at least the first refined motion vector difference; and
determining motion compensation data of the current coding block based on the forward prediction block and the backward prediction block.

14. The computing system of claim 13, the one or more programs further comprising instructions for:
based on the cost criterion of the difference of the forward prediction block and the backward prediction block, refining the motion vector difference for the backward prediction block to determine a second refined motion vector difference; and
generating the backward prediction block based on the second refined motion vector difference.

15. The computing system of claim 13, wherein the motion vector difference is refined for the forward prediction block, in accordance with (1) a determination that the current coding block has one of a group of compound reference modes consisting of NEW_NEARMV, NEW_NEARMV_OPTL, NEAR_NEWMV, and NEAR_NEWMV_OPTL, or (2) a determination that the motion vector difference is obtained for the backward prediction block and no motion vector difference is obtained for the forward prediction block.

16. The computing system of claim 13, wherein the current coding block is not used as a prediction block for a next coding block that requires refining of a next motion vector difference for the current coding block.

17. A non-transitory computer-readable storage medium storing one or more programs for execution by control circuitry of a computing system, the one or more programs comprising instructions for:
receiving a current coding block in a current image frame from a video bitstream, the video bitstream including a selection index;
determining that the current coding block is to be predicted in a joint motion vector difference (JMVD) mode;
in response to the current coding block being predicted in the JMVD mode, determining that the current coding block is associated with two bi-prediction blocks including a forward prediction block and a backward prediction block;
based on a cost criterion of a difference of the forward prediction block and the backward prediction block, refining a motion vector difference for at least the forward prediction block, further including:
determining a plurality of candidate differences of the forward prediction block and the backward prediction block based on a plurality of scaled candidate motion vector differences for the forward prediction blocks; and
based on the selection index, determining a first refined motion vector difference based on one of the plurality of candidate differences;
generating the forward prediction block based on at least the first refined motion vector difference; and
determining motion compensation data of the current coding block based on the forward prediction block and the backward prediction block.

18. The non-transitory computer-readable storage medium of claim 17, the one or more programs further comprising instructions for:
in accordance with a determination that a direction of the motion vector difference is along one of a horizontal direction and a vertical direction, restricting a refining direction for the forward prediction block to the one of the horizontal direction and the vertical direction.

19. The non-transitory computer-readable storage medium of claim 17, the one or more programs further comprising instructions for:
in accordance with a determination that a direction of the motion vector difference is along a first direction, selecting a refining direction for the forward prediction block to be identical to or perpendicular with the first direction.

20. The non-transitory computer-readable storage medium of claim 17, the one or more programs further comprising instructions for:
in accordance with a determination that the current coding block has one of a group of compound reference modes consisting of NEAR_NEAR_MV and NEAR_NEAR_OPTL, identifying the forward prediction block between the two bi-prediction blocks based on a condition, before refining the motion vector difference for the forward prediction block.

* * * * *